United States Patent [19]

Hamada et al.

[11] Patent Number: 5,568,196
[45] Date of Patent: Oct. 22, 1996

[54] MOTION ADAPTIVE NOISE REDUCTION FILTER AND MOTION COMPENSATED INTERFRAME CODING SYSTEM USING THE SAME

[75] Inventors: Takahiro Hamada; Ryoichi Kawada; Shuichi Matsumoto, all of Tokyo, Japan

[73] Assignee: Kokusai Denshin Denwa Kabushiki Kaisha, Japan

[21] Appl. No.: 422,059

[22] Filed: Apr. 14, 1995

[30] Foreign Application Priority Data

Apr. 18, 1994 [JP] Japan .................................. 6-101764

[51] Int. Cl.⁶ .................................................. H04B 7/12
[52] U.S. Cl. .......................... 348/416; 348/416; 348/415; 348/420; 348/398; 348/397
[58] Field of Search ..................................... 348/701, 420, 348/398, 397, 416, 411, 412, 419, 420

[56] References Cited

U.S. PATENT DOCUMENTS

| | | | |
|---|---|---|---|
| 5,025,316 | 6/1991 | Darby | 348/701 |
| 5,095,354 | 3/1992 | Sokawa et al. | 348/701 |
| 5,191,419 | 3/1993 | Wischermann | 348/701 |
| 5,410,307 | 4/1995 | Hekstra | 348/701 |

Primary Examiner—Tommy P. Chin
Assistant Examiner—An And Rao
Attorney, Agent, or Firm—Westman, Champlin & Kelly, P.A.

[57] ABSTRACT

An accurate motion vector is locally estimated in a moving image, and motion compensation is performed on the image in the immediately preceding frame based on the motion vector obtained. Next, a low pass filter is applied between the current frame and the immediately preceding frame that has been motion compensated. By controlling the filter coefficient in pixel units when the filter is applied, blurring of a moving image is suppressed to a minimum while noise is largely reduced.

1 Claim, 7 Drawing Sheets

FIG. 2

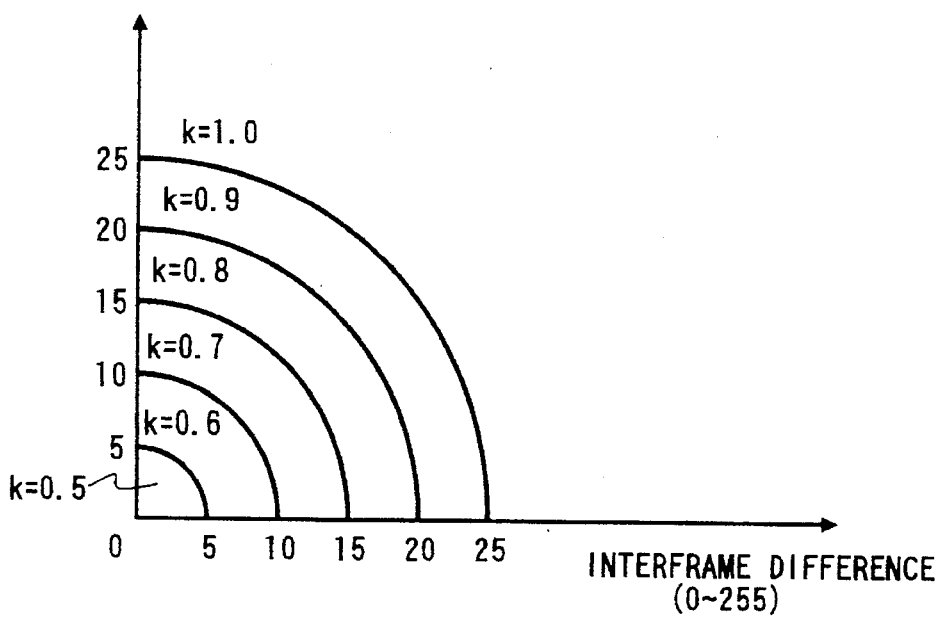

FIG. 6

TEST DATA AND CODING PARAMETERS

| TEST ITEM | 4:2:2 COMPONENT SIGNAL (720 PELS X 480 LINES) FLOWER GARDEN, MOBILE AND CALENDER |
|---|---|
| MOTION ESTIMATION RANGE | HORIZONTAL ±15 PELS (PEL ACCURACY), VERTICAL ±14 LINES (2 LINES ACCURACY), TOTAL 465 VECTORS, FULL SEARCH |
| MOTION ESTIMATION UNITS | 16 PELS X 16 LINES (MACROBLOCK) UNITS |
| QUANTIZATION | WEIGHTING WITH VISUAL CHARACTERISTICS, LINEAR QUANTIZATION AFTER APPLYING MATRIX |
| VARIABLE LENGTH CODING | DCT COEFFICIENTS; RUN LENGTH OF 2 DIMENSIONS MOTION VECTORS; B2 CODE |
| NO. OF FRAMES | 90 FRAMES |
| BIT RATE AFTER COMPRESSION | APPROX. 5 Mbps (INPUT 210 Mbps) |

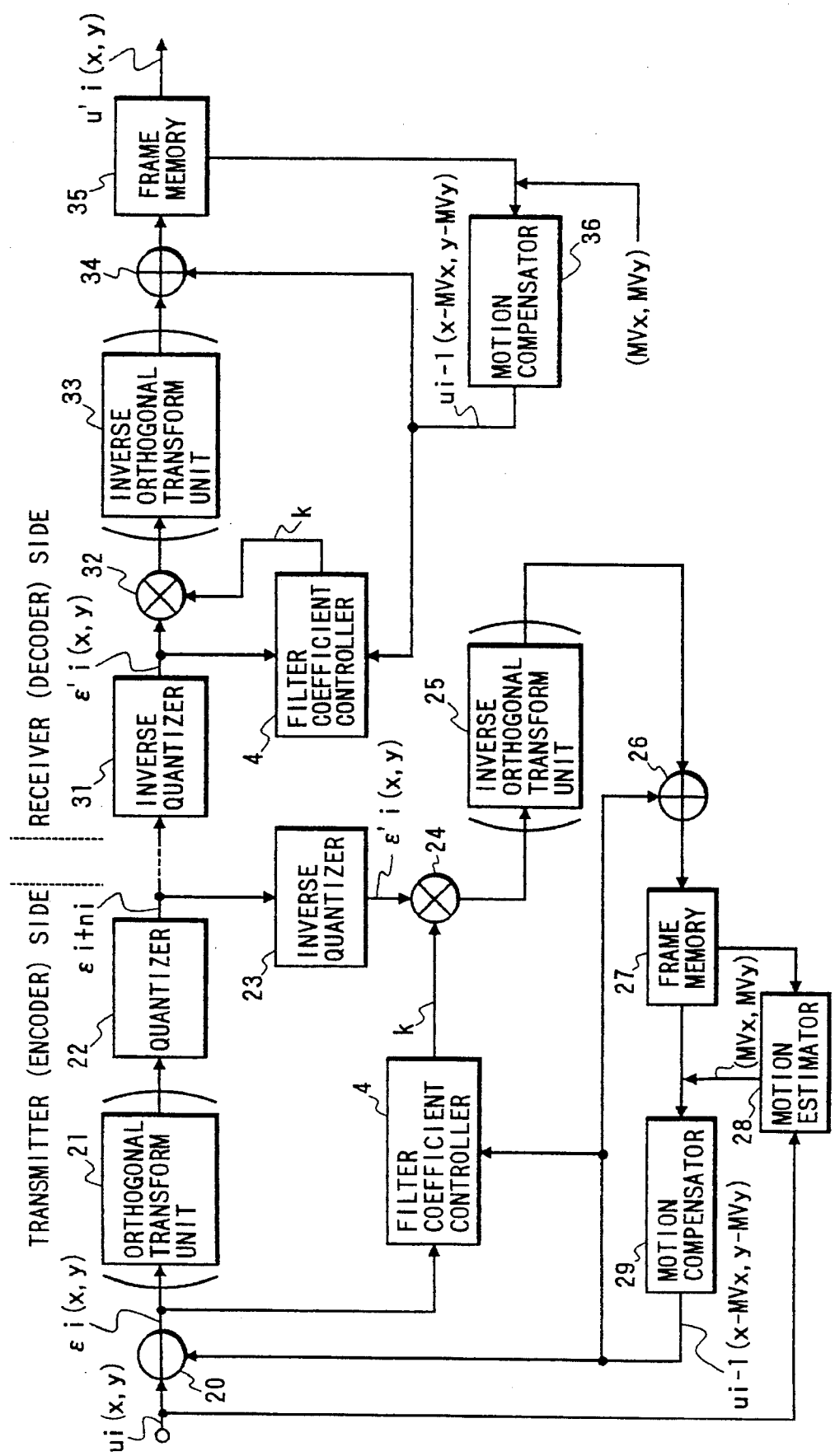

FIG. 7

COMPARISON OF NOISE REDUCTION SCHEMES

| | FLOWER GARDEN | | MOBILE AND CALENDAR | |
|---|---|---|---|---|
| | 5 STEP EVALUATION / SUBJECTIVE EVALUATION | INFORMATION AMOUNT GENERATED | 5 STEP EVALUATION / SUBJECTIVE EVALUATION | INFORMATION AMOUNT GENERATED |
| NO NOISE REDUCTION (SCHEME A) | 3.3 — MOSQUITO NOISE DISTURBING ON ROOF, FIELD FLOWERS | 5.0 Mbps | 3.1 — CALENDAR CHARACTERS ARE BLURRED, MOSQUITO NOISE SEVERE ON EDGE OF BACKGROUND | 5.0 Mbps |
| SIMPLE INTERFRAME NOISE REDUCTION FILTER (SCHEME B) | 3.4 — ALMOST NO IMPROVEMENT COMPARED TO (A) | 5.0 Mbps | 3.2 — ALMOST NO IMPROVEMENT COMPARED TO (A) | 5.0 Mbps |
| MOTION ADAPTIVE NOISE FILTER (SCHEME C) | 4.0 — DISTURBED TEXTURE BECOMES STEADY WITH MOSQUITO NOISE GREATLY REDUCED | 5.0 Mbps | 4.1 — SHARP IMPROVEMENT OF CHARACTERS AND EDGES | 5.0 Mbps |
| MOTION COMPENSATED DCT WITH NOISE REDUCTION FILTER (SCHEME D) | 4.0 — SAME PICTURE QUALITY AS (C) | 4.7 Mbps | 4.1 — SAME PICTURE QUALITY AS (C) | 4.6 Mbps |

5,568,196

MOTION ADAPTIVE NOISE REDUCTION FILTER AND MOTION COMPENSATED INTERFRAME CODING SYSTEM USING THE SAME

BACKGROUND OF THE INVENTION

1. Field of the Invention

This invention relates to a motion adaptive noise reduction filter that removes noise on a moving image, and thereby achieves a high quality moving image. It further relates to a motion compensated interframe coding system using this filter.

2. Description of the Prior Art

In a conventional technique for efficiently removing noise from a moving image, an interframe low pass filter is constructed by making use of the fact that there is a high interframe correlation between image signals, but not much interframe correlation between noise. This technique efficiently removes noise from signal components in stationary images or slowly moving parts of images.

In another conventional method, known as the post-processing scheme, a filter is introduced to remove coding noise in motion compensated interframe coding where the signals are assumed to be compressed.

This second method, as shown in FIG. 8, may for example comprise a motion compensated interframe coding system wherein an input signal xi is encoded, and a prediction error signal (ϵi+ ni) with a quantization noise ni is obtained. This is reproduced as a prediction signal yi2, the noise is removed by a noise reduction filter consisting of an interframe closed loop, and a final output signal yi3 is obtained. Herein, $Z^{-1}$ is a delay factor representing the frame delay.

According to the first method, however, either there was no motion compensation, or even if such compensation was performed, it was applied to screen units. As a result, motion compensation was inadequate, the moving image was blurred, and noise could not be completely eliminated. Further, if the aforesaid interframe low pass filter was applied to areas where the original signal varied largely between frames, i.e. to areas with rapid motion, much of the original signal was lost, and judder or other distortion occurred. For example, if it were applied to the image of a man standing and waving his hand vigorously up and down, noise could be efficiently removed from image parts where the man's body was still, but the waving hand was affected by judder or other distortion.

Further, according to the aforesaid second method, the motion compensated interframe coding system requires a loop to reproduce the prediction error signal (ϵi+ni) as the prediction signal yi2, and it also requires a multiplier in the loop of the noise reduction filter that leads to an increase of hardware. Moreover, the second method does not contribute in any way to reducing the amount of information to be transmitted, i.e. to the amount of information in the prediction error signal ϵi.

SUMMARY OF THE INVENTION

It is therefore an object of the invention to resolve the aforesaid problems in the conventional technology, and to provide a motion adaptive noise reduction filter that can efficiently treat noise in image parts that are moving.

It is a further object of this invention to provide a motion compensated interframe coding system using the aforesaid motion adaptive noise reduction filter that does not increase hardware, and that contributes to reducing the amount of information to be transmitted.

In order to achieve the aforesaid objects, this invention is characterized in comprising a motion adaptive noise reduction filter, this filter comprising means for locally detecting a motion vector in the moving image, means for compensating motion based on the motion vector obtained, a low pass filter that is applied to a current frame and to a motion compensated preceding frame, and a filter coefficient controller that controls a filter coefficient k of the low pass filter.

According to this invention, a precise motion vector is detected locally, motion detection is performed based on the motion vector obtained, and the low pass filter is then applied between frames. By controlling the filter coefficient in pixel unfits during this process, blurring is suppressed to a minimum even in moving images, noise is largely reduced, and a high image quality may be obtained.

This invention is further characterized in comprising a motion compensated interframe coding system provided with a motion compensated interframe DPCM loop on the encoder side, an interframe DPCM on the decoder side, a multiplier in the DPCM loop on the encoder side that multiplies a quantized reproduced value of a prediction error immediately before generating a locally decoded image by the aforesaid filter coefficient k, and a multiplier that multiplies a reproduced value of a prediction error immediately before interframe DPCM on the decoder side by the aforesaid filter coefficient k.

According to this invention, when motion compensated interframe coding is performed for the purpose of image compression, filter coefficients are applied to quantized reproduced values of prediction errors on both the encoder and the decoder side. There is therefore almost no increase of hardware, and the same processing may be performed as that of the aforesaid motion adaptive noise reduction filter. This also leads to a decrease in the amount of information generated, and high image quality is achieved with high compression by compact hardware.

BRIEF DESCRIPTION OF THE DRAWINGS

FIG. 2 is a drawing showing one example of a conversion table in a filter coefficient controller.

FIG. 3 is a block diagram showing a second embodiment of this invention.

FIG. 6 is a descriptive drawing of test data and coding parameters used for the aforesaid verification.

FIG. 7 is a descriptive drawing of test comparison results.

DETAILED DESCRIPTION OF THE PREFERRED EMBODIMENTS

Figure 1:
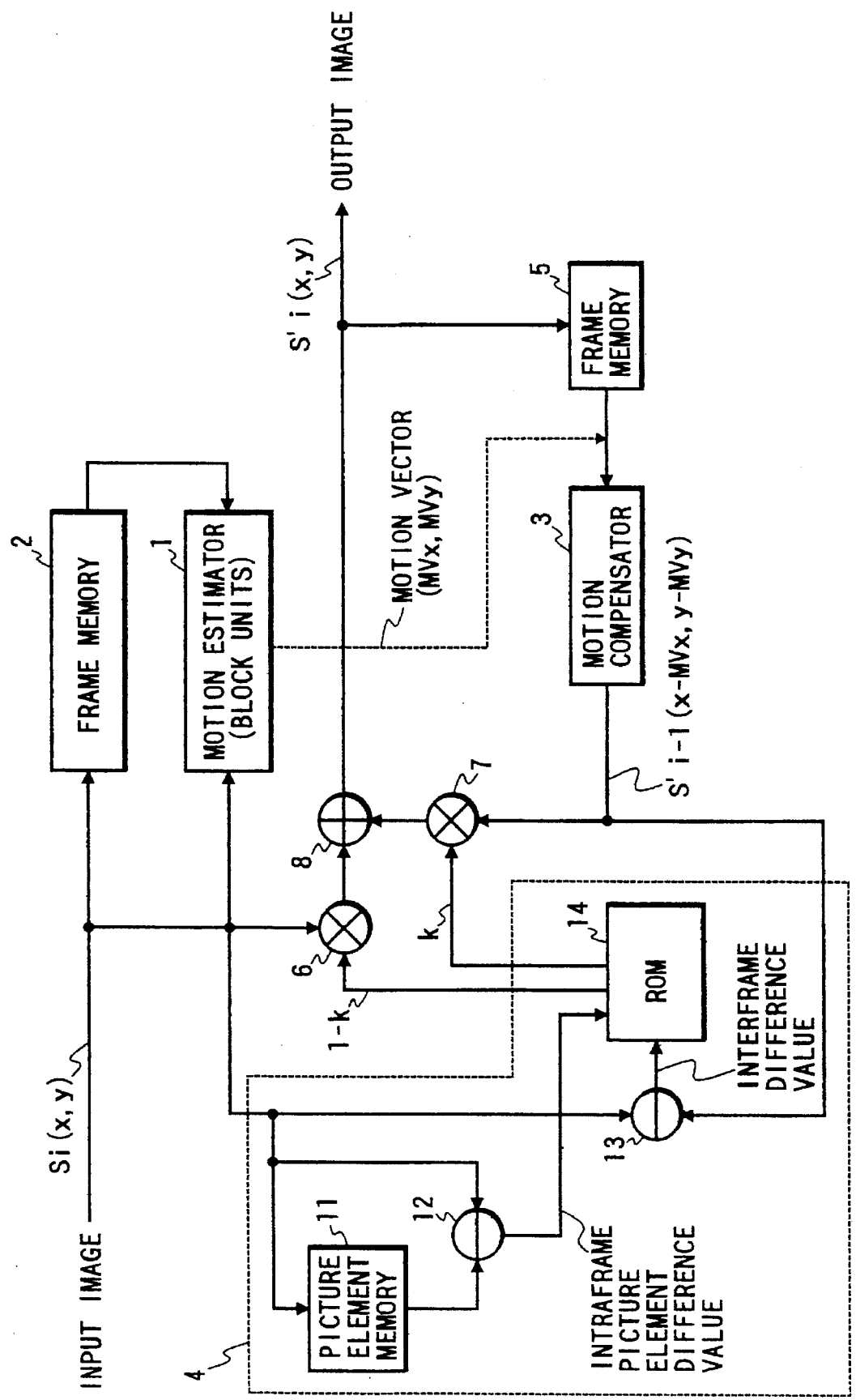
FIG. 1 is a block diagram showing the construction of a first embodiment of the invention.

This invention will now be described in further detail referring to the drawings.

In FIG. 1, a motion estimator 1 performs motion estimation of an image in block units of, for example, 8 pixels×8 lines size. A frame memory 2 stores image data of preceding frames in order to estimate the motion of the image. A motion compensator 3 compensates the motion of the image in block units, and a filter coefficient controller 4 controls a filter coefficient k between frames. A frame memory 5 stores output images with reduced noise. Si(x,y) is a pixel of an input image at a point (x,y) in the ith frame (current frame). Multipliers 6, 7 and an adder 8 constitute a noise reduction filter.

The filter coefficient controller 4 comprises a pixel memory 11, subtracters 12, 13 and a ROM 14 that converts intraframe pixel difference values and interframe difference values output by the subtracters 12, 13 into filter coefficients k. An example of a conversion table stored in the ROM 14 is shown in FIG. 2. The horizontal axis in this figure represents interframe difference values, while the vertical axis represents intraframe pixel difference values, both values being shown as numbers expressed in terms of 8 bits. In general, the smaller the interframe and intraframe pixel difference values, i.e. the stronger the correlation between pixels, the smaller the filter coefficient k. Conversely, when these values become large, i.e. when the correlation is weak, the filter coefficient k becomes large.

Next, the action of this embodiment will be described. The motion estimator 1 divides an input image screen into a plurality of small blocks. Motion is estimated in block units by comparing the immediately preceding frame stored in the frame memory 2 with the current frame, and a motion vector (MVx, MVy) is found for each block.

At the same time, the multiplier 6 multiplies the value of the pixel Si(x,y) of the input image by a filter coefficient 1-k which removes noise. The immediately preceding (i-1)th frame from which noise has already been removed by the filter, is stored in the frame memory 5, and this immediately preceding (i-1)th frame is input to the motion compensator 3. The motion compensator 3 uses the motion vector (MVx, MVy) to compensate the (i-1)th frame. The multiplier 7 multiplies compensated pixels by the filter coefficient k from the ROM 14. The adder 8 combines these two so as to obtain an output image S'i(x,y). The subtracter 13 in the filter coefficient controller 4 also calculates an interframe difference value (Si − S'i-1). The pixel memory 11 and subtracter 12 calculate pixel difference values with respect to adjacent pixels in the same frame. Based on these difference values, the ROM 14 controls the filter coefficient k.

As described hereintofore, according to this invention, the motion Compensator 3 performs motion compensation in block units on the image of the preceding frame. The filter coefficient controller 4 calculates a filter coefficient k for each pixel based on interframe difference values and intraframe pixel difference values, and filtering is then performed by the multipliers 6, 7 and the adder 8. In general, the interframe difference values and intraframe pixel difference values for noise on a picture are larger, so the filter coefficient k will also be large. The adder 8 ignores the image from the multiplier 6 which contains noise, and outputs an image consisting mainly of the image of the preceding frame from the multiplier 7, from which noise has been removed, as the output image S'i(x,y). As a result, noise is effectively removed not only from still parts of the picture or parts where there is slow movement, but also from parts where there is rapid movement.

Next, a second embodiment of the invention will be described with reference to FIG. 3. This figure shows the principle of a motion compensated interframe coding scheme with a noise filter, wherein the motion adaptive noise reduction filter of embodiment 1 is applied to motion compensated interframe coding.

In the figure, a subtracter 20 computes the difference between a pixel ui(x,y) of the input image and a prediction value ui-1(x-MVx, y-MVy), and outputs it as a prediction error ∈i(x,y). An orthogonal transform unit 21 then performs DCT or a Hadamard transform. This is used when the images are highly compressed, and is not absolutely indispensable to the invention. A quantizer 22 quantizes the prediction errors ∈i(x,y), and an inverse quantizer 23 reverse quantizes the quantized prediction errors ∈i(x,y). A multiplier 24 multiplies prediction error reproduced values containing noise from the quantization of the aforesaid prediction errors ∈i(x,y), by the filter coefficient k from the filter coefficient controller 4, and noise is thereby reduced. Numeral 25 is an inverse orthogonal transform unit, and numeral 26 is an adder. A frame memory 27 stores locally decoded images, and a motion estimator 28 estimates the motion vector (MVx, MVy). A motion compensator 29 uses the motion vector (MVx, MVy) to compensate local decoded image stored in the frame memory 27. The filter coefficient controller 4 has an identical or similar construction to that in FIG. 1 which has the same reference number. According to this embodiment, difference values (prediction errors) ∈i(x, y) are used instead of the input image Si(x,y) of FIG. 1, although this is not absolutely essential.

In this arrangement, there is a motion compensated interframe DPCM loop (DPCM=Differential Pulse Coded Modulation) on the transmitting side, i.e. the encoder side, of the motion compensated interframe coding scheme with noise reduction filter.

Next the receiver, i.e. the decoder, will be described.

An inverse quantizer 31 reverse quantizes the quantized prediction error values ∈i(x,y) and noise values ni sent from the transmitting side. Numeral 32 is a multiplier, and numeral 33 is an inverse orthogonal transform unit. An adder 34, frame memory 35 and motion compensator 36 together constitute an interframe DPCM on the decoding side.

The characteristic feature of this embodiment is that the filter controller 4 and multiplier 24 are provided on the transmitting side and the filter controller 4 and multiplier 32 on the receiving side of the motion compensated interframe coding scheme, the other parts of the arrangement being identical to that of the prior art.

Next, the action of this embodiment will be described. On the transmitting (encoder) side, the motion estimator 28 estimates the motion between the pixel ui(x,y) on the current, ith frame that is to be coded and the reproduced image in the immediately preceding (i-1)th frame stored in the frame memory 27, and calculates a motion vector (MVx, MVy). Based on this motion vector, the motion compensator 29 performs motion compensation, and generates a predicted value ui-1(x-MVx, y-MVy).

The subtracter 20 calculates a difference value (prediction error) ∈i(x,y) between the pixel ui(x,y) and the predicted value ui-1(x-MVx, y-MVy). After the quantizer 22 quantizes this difference ∈i(x,y), it is sent to the receiving side together with the motion vector.

On the receiving side, a motion adaptive noise reduction filter comprising the filter controller 4 and multiplier 32 is applied to the reproduced value ∈i(x,y) of the prediction error so as to remove noise. Next, the reproduced value ∈i(x,y) of the prediction error is output as an ordinary image signal by the adder 34, frame memory 35 and motion compensator 36. The reproduced image is then u'i(x,y)

Figure 4:
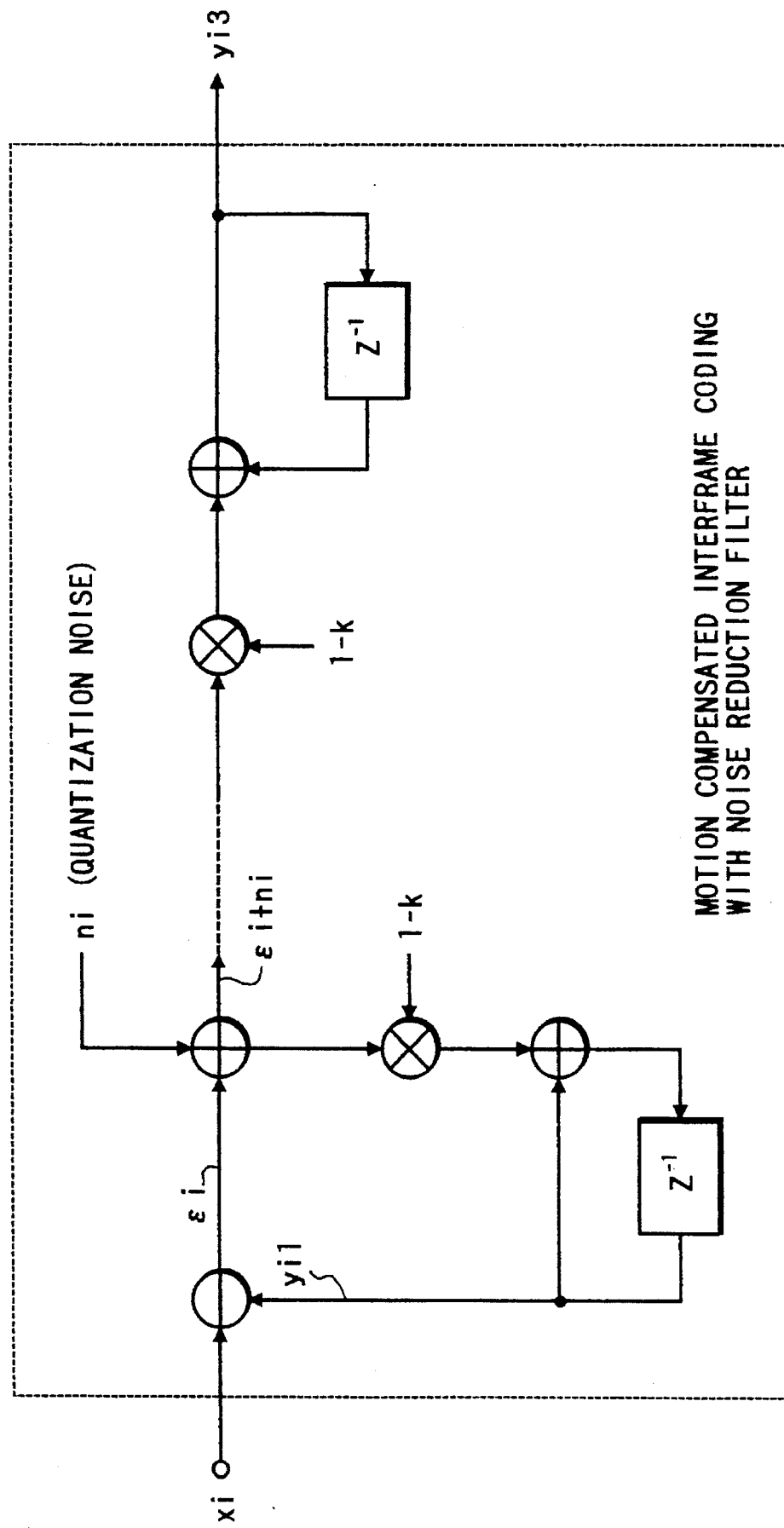
FIG. 4 is a model representation of the main parts of FIG. 3.

FIG. 4 shows a simplified model representation of the arrangement of the second embodiment of FIG. 3. Herein, xi is an input signal, yi1 is a prediction signal, εi is a prediction error signal, ni is a quantization noise signal and yi3 is the final output signal. k is a filter coefficient, and $Z^{-1}$ is a delay factor showing the frame delay. In the figure, the direct output (1-k) from the filter coefficient controller 4 in FIG. 3 may be used, or a subtractor may be applied to calculate the output k of the filter coefficient controller 4.

Figure 8:
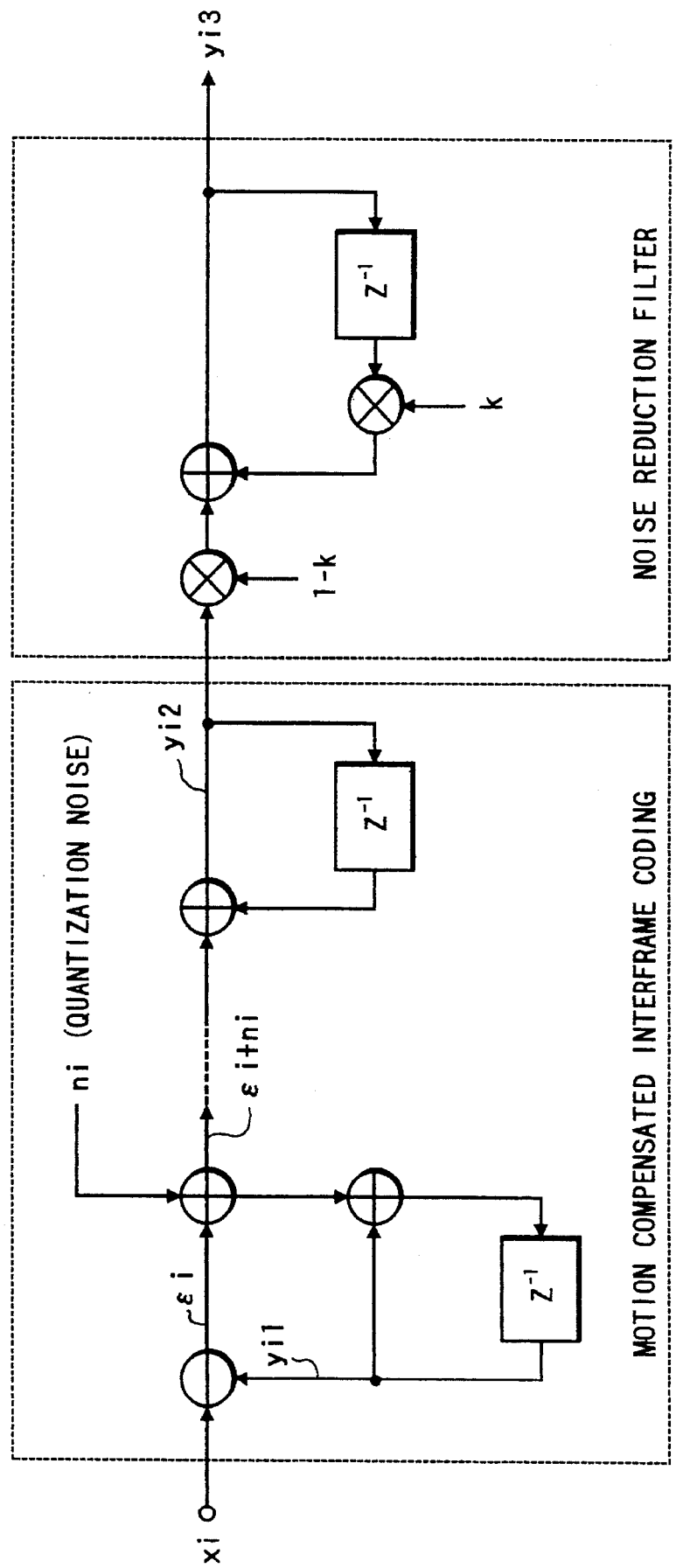
FIG. 8 is a model representation of a case when a noise reduction filter is applied to a conventional motion compensated interframe coding scheme.

Next, by comparing the model diagram of the prior art in FIG. 8 with the model diagram of FIG. 4, it will be proven that the effect of these two systems is equivalent.

First, a transmission function starting from a input terminal of the input signal xi is found in the model representation of FIG. 8. Considering the prediction signal yi1 and prediction error signal εi, the following relations hold:

$$yi1 = Z^{-1}(yi1 + xi - yi1 + ni) = Z^{-1}(xi + ni) \quad (1)$$

$$\epsilon i = xi - yi1 = (1-Z^{-1})xi - Z^{-1}ni \quad (2)$$

For yi2, yi3, the following relations hold:

$$yi2 = (\epsilon i + ni)/(1-Z^{-1}) \quad (3)$$

$$yi3 = kZ^{-1}yi3 + (1-k)(\epsilon i + ni)/(1-Z^{-1}) \quad (4)$$

Substituting Equation (2) into Equation (3) gives yi2=xi+ni, so calculating the final output signal yi3 from Equation (4):

$$yi3 = (1-k)/(1-kZ^{-1})(xi + ni) \quad (5)$$

Next, a transmission function for the output signal yi3 starting from the input terminal of the input signal xi is determined in the model representation of FIG. 4. Again considering the prediction signal yi1 and prediction error signal εi, the following relations (6) and (8) hold:

$$yi1 = Z^{-1}\{yi1 + (1-k)(xi - yi1 + ni)\} \quad (6)$$

Rearranging:

$$yi1 = (xi + ni)(1-k)Z^{-1}/(1-kZ^{-1}) \quad (7)$$

$$\begin{aligned}\epsilon i &= xi - yi1 \\ &= \{(1-Z^{-1})xi - (1-k)Z^{-1}ni\}/(1-kZ^{-1})\end{aligned} \quad (8)$$

Specifically considering the final output yi3, the following relation holds:

$$yi3 = Z^{-1}yi3 + (1-k)(\epsilon i + ni), \text{ i.e.}$$

$$yi3 = (1-k)/(1-Z^{-1})(\epsilon i + ni) \quad (9)$$

Substituting Equation (8) into Equation (9), the following relation is obtained:

$$\begin{aligned}yi3 &= (1-k)/(1-Z^{-1})[\{(1-Z^{-1})xi - \\ &\quad (1-k)Z^{-1}ni\}/(1-kZ^{-1}) + ni] \\ &= (1-k)/(1-kZ^{-1})(xi + ni)\end{aligned} \quad (10)$$

It is seen that Equation (5) in the model of FIG. 8 is identical to Equation (10) in the model of FIG. 4, and that the two models are equivalent. In other words according to this second embodiment, by incorporating the filter controller 4 into coding at the transmitter and the receiver, motion compensated interframe coding can be implemented with almost no increase of hardware.

According to this embodiment, the signal output from the transmitter to the receiver, i.e. the prediction error εi, is given by Equation (8). Concerning this prediction error εi, Equation (2) in the model of FIG. 8 and Equation (8) may be compared.

Insofar as concerns the difference value $(1-Z^{-1})xi$, Equation (8) is $1/(1-kZ^{-1})$ times Equation (2). Insofar as concerns the feedback quantization noise $-Z^{-1}ni$, Equation (8) is $(1-k)/(1-kZ^{-1})$ times Equation (2). This may be expressed by factors H(z), kH(z) that operate on the difference value $(1-Z^{-1})xi$ and feedback quantization noise $-Z^{-1}ni$ respectively, i.e.:

$$H(z) = 1/(1-kZ^{-1})$$

$$kH(z) = (1-k)/(1-kZ^{-1})$$

H(z) and kH(z) represent high band suppression filters. In other words, motion compensated interframe difference values and feedback quantization noise with a low interframe correlation containing a large number of high frequency components become smaller due to the effect of this filter, which leads to compression of the amount of information output by the transmitter to the receiver.

Figure 5:
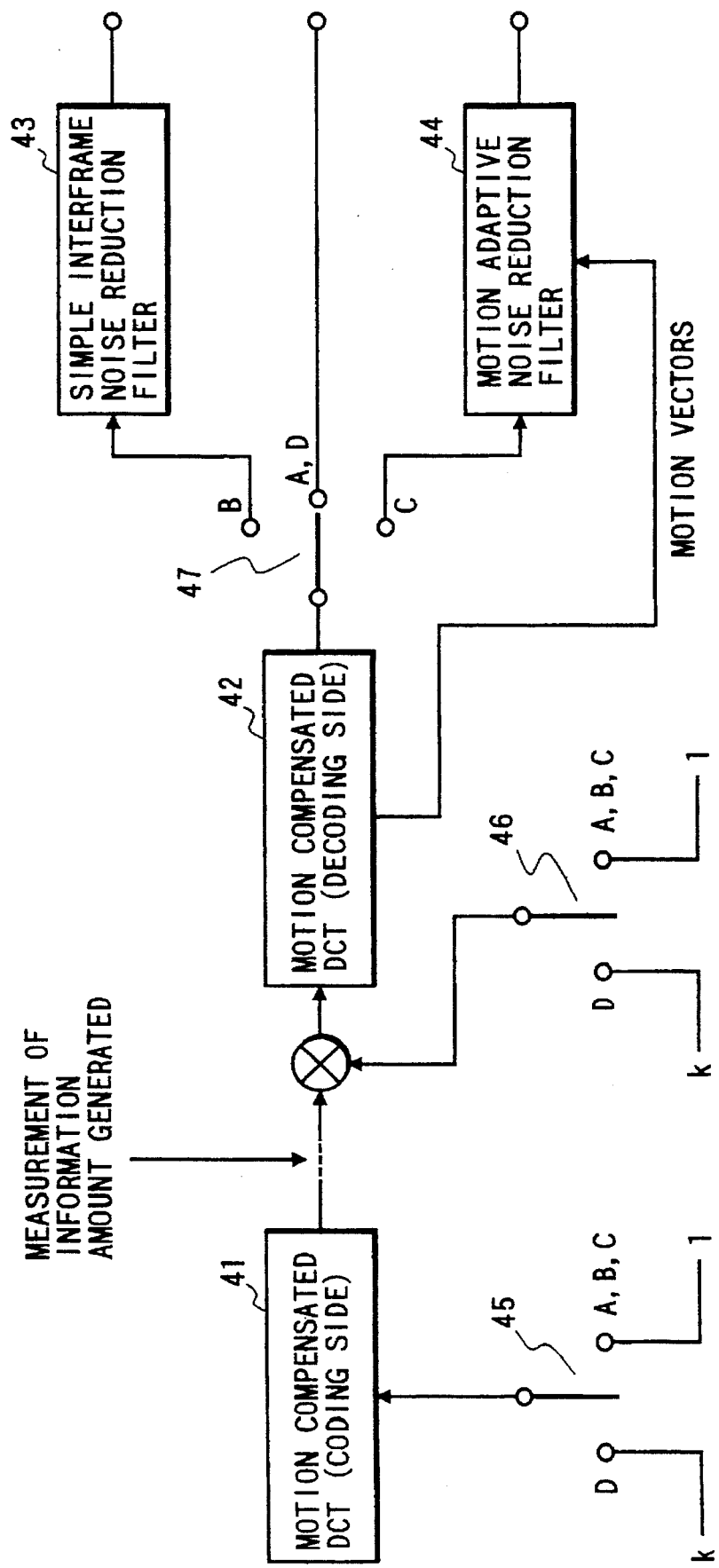
FIG. 5 is a schematic drawing of a device used to verify the effect of this invention.

Next, the effect of this invention is verified by a motion compensated discrete cosine transform interframe coding system (motion Compensated DCT) as shown in FIG. 5.

In the figure, a motion compensated DCT41 is a unit on the coding side, and a motion compensated DCT42 is a unit on the decoding side. A simple interframe noise reduction filter 43 is a conventional filter, and a motion adaptive noise reduction filter 44 is of the type described in Embodiment 1 of this invention. Switches 45, 46, 47 respectively have the function of implementing the conventional system or the device of this invention.

Using the switches 45, 46, 47, if A is selected (i.e. in scheme A), noise generated during coding is not removed. If B is selected (i.e. in scheme B), a conventional scheme is implemented with the addition of the simple interframe noise reduction filter 43 that does not take motion into account to noise generated during coding. If C is selected (i.e. in scheme C), the motion adaptive noise reduction filter of this invention 44 is applied to noise generated during coding. If D is selected (i.e. in scheme D), the filter coefficient controllers 4 on the transmitting and receiving sides of FIG. 3 are applied to noise generated during coding.

FIG. 6 shows coding parameters and test data in motion compensated DCT coding. The test data actually consisted of "Flower Garden" and "Mobile and Calendar". These images are well known, and their description is therefore omitted here FIG. 7 shows a subjective evaluation and bit rates of the images reproduced under these conditions. As seen from the figure, noise is effectively unchanged in the conventional schemes A and B.

It is however seen that in the noise reduction scheme C according to this invention, edge noise that is particularly disturbing is largely reduced. Further, in the scheme D according to this invention, effectively the same image quality as in scheme C is obtained with almost no hardware increase, and a reduction in the amount of information generated is achieved. This demonstrates the efficacity of this invention.

What is claimed is:

1. A motion compensated interframe coding system comprising a motion compensated interframe DPCM loop on an encoder and an interframe DPCM on decoder; said encoder comprising:

a means for determining a filter coefficient k based on an absolute value of a difference between a current frame and compensated preceeding frame and on an absolute value of a difference between adjacent pixels in a frame;

a multiplier that multiplies a quantized, reproduced value of a prediction error immediately prior to producing a locally decoded image in said motion compensated interframe DPCM loop on the encoder, by said filter coefficient k; and a decoder comprising:

a means for determining a filter coefficient k based on an absolute value of a difference between a received frame and compensated preceeding frame and on an absolute value of a difference between adjacent pixels in a frame; and a multiplier that multiplies a prediction error reproduced value immediately prior to said interframe DPCM on the decoding side, by said filter coefficient k.

* * * * *

UNITED STATES PATENT AND TRADEMARK OFFICE
CERTIFICATE OF CORRECTION

PATENT NO. : 5,568,196
DATED : October 22, 1996
INVENTOR(S) : Hamada et al.

It is certified that error appears in the above-indentified patent and that said Letters Patent is hereby corrected as shown below:

Column 5, line 20, please delete

"$yi1=Z^{-1}(yi1 + xi-yi+ni)=Z^{-1}(xi+ni)$"

and insert

--$yi1=Z^{-1}(yi1 + xi-yi1+ni)=Z^{-1}(xi+ni)$--.

Column 7, line 6, after "on", please insert --a--.

Signed and Sealed this

Eighth Day of July, 1997

Attest:

BRUCE LEHMAN

Attesting Officer

Commissioner of Patents and Trademarks